US008650645B1

(12) United States Patent
Thompson et al.

(10) Patent No.: US 8,650,645 B1
(45) Date of Patent: Feb. 11, 2014

(54) SYSTEMS AND METHODS FOR PROTECTING PROPRIETARY DATA (75) Inventors: Tracy Thompson, McKinney, TX (US); Ernesto L. Bombalier, Atlanta, GA (US)

(73) Assignee: McKesson Financial Holdings, Hamilton (BM)

( * ) Notice: Subject to any disclaimer, the term of this patent is extended or adjusted under 35 U.S.C. 154(b) by 32 days.

(21) Appl. No.: 13/434,362

(22) Filed: Mar. 29, 2012

(51) Int. Cl.
*G06F 21/00* (2013.01)

(52) U.S. Cl.
USPC ............. 726/23; 726/22; 726/25; 713/187; 713/189; 709/224

(58) Field of Classification Search
USPC .................................................... 726/22–23
See application file for complete search history.

(56) References Cited

U.S. PATENT DOCUMENTS

| | | | |
|---|---|---|---|
| 5,628,530 A | 5/1997 | Thornton | |
| 5,944,821 A * | 8/1999 | Angelo | 726/22 |
| 6,012,035 A | 1/2000 | Freeman et al. | |
| 6,757,898 B1 | 6/2004 | Ilsen et al. | |
| 6,769,228 B1 | 8/2004 | Mahar | |
| 7,155,397 B2 | 12/2006 | Alexander et al. | |
| 2002/0002495 A1 | 1/2002 | Ullman | |
| 2002/0087583 A1 | 7/2002 | Morgan et al. | |
| 2002/0111832 A1 | 8/2002 | Judge | |
| 2002/0198831 A1 | 12/2002 | Patricelli et al. | |
| 2003/0009367 A1 | 1/2003 | Morrison | |
| 2003/0050799 A1 | 3/2003 | Jay et al. | |
| 2003/0149625 A1 | 8/2003 | Leonardi et al. | |
| 2003/0154163 A1 | 8/2003 | Phillips et al. | |
| 2003/0229540 A1 | 12/2003 | Algiene | |
| 2004/0039599 A1 | 2/2004 | Fralic | |
| 2004/0064732 A1 * | 4/2004 | Hall | 713/201 |
| 2004/0073457 A1 | 4/2004 | Kalies | |
| 2004/0078234 A1 | 4/2004 | Tallal, Jr. | |

(Continued)

FOREIGN PATENT DOCUMENTS

| | | |
|---|---|---|
| CA | 2482370 | 3/2006 |
| WO | 1995003569 | 2/1995 |
| WO | 2000039737 | 7/2000 |
| WO | 2007025295 | 3/2007 |

OTHER PUBLICATIONS

Non-Final Office Action for U.S. Appl. No. 13/108,495 mailed Apr. 8, 2013.

(Continued)

*Primary Examiner* — Morshed Mehedi
(74) *Attorney, Agent, or Firm* — Sutherland Asbill & Brennan LLP (57) ABSTRACT

Systems and methods for protecting proprietary data are provided. A file of computer-executable code that facilitates the processing of proprietary information when executed may be identified. At least one hashing operation may be performed on the file to generate a first representative value associated with the file. At least one approval associated with validation of the file may be received by the computing system. The at least one approval may be stored in association with the generated representative value. Prior to the execution of the file, the at least one hashing operation may be utilized to determine a second representative value associated with the file. Execution of the file may be selectively permitted based at least in part upon a determination of whether the second representative value matches the stored first representative value and whether the at least one approval is available.

18 Claims, 5 Drawing Sheets

(56) References Cited

U.S. PATENT DOCUMENTS

| | | | |
|---|---|---|---|
| 2004/0117323 A1 | 6/2004 | Mindala | |
| 2004/0148198 A1 | 7/2004 | Kalies | |
| 2004/0249745 A1 | 12/2004 | Baaren | |
| 2005/0015280 A1 | 1/2005 | Gabel et al. | |
| 2005/0060201 A1 | 3/2005 | Connely et al. | |
| 2005/0065824 A1 | 3/2005 | Kohan | |
| 2005/0102169 A1 | 5/2005 | Wilson | |
| 2005/0102172 A1 | 5/2005 | Sirmans, Jr. | |
| 2005/0132205 A1* | 6/2005 | Palliyil et al. | 713/188 |
| 2005/0154627 A1 | 7/2005 | Zuzek et al. | |
| 2005/0187793 A1 | 8/2005 | Myles | |
| 2005/0197862 A1 | 9/2005 | Paterson et al. | |
| 2005/0240473 A1 | 10/2005 | Ayers, Jr. et al. | |
| 2005/0251677 A1* | 11/2005 | Maeda et al. | 713/165 |
| 2005/0288972 A1 | 12/2005 | Marvin et al. | |
| 2006/0020514 A1 | 1/2006 | Yered | |
| 2006/0020821 A1* | 1/2006 | Waltermann et al. | 713/189 |
| 2006/0026041 A1 | 2/2006 | Ullman | |
| 2006/0149784 A1 | 7/2006 | Tholl et al. | |
| 2006/0184391 A1 | 8/2006 | Barre et al. | |
| 2006/0184792 A1* | 8/2006 | Berlin | 713/165 |
| 2006/0259363 A1 | 11/2006 | Jhetam et al. | |
| 2007/0005402 A1 | 1/2007 | Kennedy et al. | |
| 2007/0050209 A1 | 3/2007 | Yered | |
| 2007/0061596 A1* | 3/2007 | Ferguson et al. | 713/193 |
| 2007/0118729 A1* | 5/2007 | Adams et al. | 713/1 |
| 2007/0136100 A1 | 6/2007 | Daugherty et al. | |
| 2007/0150314 A1 | 6/2007 | Abraham-Fuchs et al. | |
| 2007/0233525 A1 | 10/2007 | Boyle | |
| 2007/0233526 A1 | 10/2007 | Hoffman et al. | |
| 2007/0239493 A1 | 10/2007 | Sweetland et al. | |
| 2008/0134297 A1* | 6/2008 | Clinick et al. | 726/4 |
| 2009/0031141 A1* | 1/2009 | Pearson et al. | 713/187 |
| 2009/0112643 A1 | 4/2009 | Brys et al. | |
| 2010/0094836 A1 | 4/2010 | Duncan et al. | |
| 2010/0100963 A1* | 4/2010 | Mahaffey | 726/25 |
| 2010/0293388 A1* | 11/2010 | Ammer et al. | 713/187 |
| 2011/0154028 A1* | 6/2011 | Kirkup et al. | 713/158 |
| 2011/0185417 A1* | 7/2011 | Zhou et al. | 726/22 |
| 2011/0225655 A1* | 9/2011 | Niemela et al. | 726/24 |
| 2012/0004945 A1 | 1/2012 | Vaswani | |
| 2012/0072725 A1* | 3/2012 | Fanton et al. | 713/165 |
| 2012/0116984 A1 | 5/2012 | Hoang et al. | |
| 2012/0198514 A1* | 8/2012 | McCune et al. | 726/1 |
| 2013/0145472 A1* | 6/2013 | Ramabhatta et al. | 726/25 |

OTHER PUBLICATIONS

Sampson, R.J., Taking Control of Health Care Costs, Best's Review—Life Health Insurance Edition, Nov. 1983, vol. 84, Issue 7, USA; Abstract only.

Anonymous, ACS to Demonstrate Electronic Health Record Solution Suite at MMIS 2007 Conference; EHR Tools Consolidate Data, Provide Useful Information at the Point of Care for Medicaid Providers, Payers, and Patients, PR Newswire, Aug. 13, 2007, New York, NY, USA.

Lamb, J., New Era of Electronic Medicine Management: E-Prescriptions, Britain's Traditionally Cautious National Health Service is Starting Trials for Online Prescription, with the Aim of Cutting Costs. Financial Times, London, Feb. 21, 2001, p. 6, London, United Kingdom.

Anonymous, Pharmacy Industry Leaders Launch Firm to Supply Real-Time Data. PR Newswire. Jul. 30, 2001, p. 1, New York, NY, USA.

Anonymous, Medic; On-line Goes In-House, Chain Store Age Executive, Jan. 1987, vol. 63, Issue 1, USA; Abstract only.

Anonymous, TechRx Announces Successful Beta Deployment of T-Rex. PR Newswire. May 13, 2002.

Non-Final Office Action for U.S. Appl. No. 13/108,495 mailed Sep. 4, 2013.

* cited by examiner

SYSTEMS AND METHODS FOR PROTECTING PROPRIETARY DATA

TECHNICAL FIELD

Aspects of the disclosure relate generally to the protection of proprietary data, and more particularly, to systems and methods for mitigating risk and exposure relating to the delivery of proprietary data in a client environment.

BACKGROUND

A wide variety of healthcare transactions, such as prescription claim transactions, are typically processed and/or routed through a service provider. For example, claim transactions are typically received by the service provider from healthcare providers (e.g., pharmacies) and routed to payers. Similarly, adjudicated responses to claim transactions are typically received by the service provider from the payers and routed to the healthcare providers. During the processing and routing of healthcare transactions, a wide variety of healthcare information may be processed and stored by the service provider. The stored data, along with a wide variety of other healthcare data, may subsequently be accessed by the service provider and utilized for internal processing or to generate data deliverables that are provided to customers of the service provider. For example, various reports associated with processed healthcare transactions may be provided to a healthcare provider. In some situations, plug-ins, scripts, and/or other software components are developed and utilized to evaluate healthcare data.

In many instances, the information included in a data deliverable includes confidential and/or proprietary healthcare information. In order to protect the security of this information, control processes for preparing the data deliverables have been developed. These processes include various steps and procedures that should be followed in order to mitigate risk associated with the data deliverables. However, existing risk mitigation processes can often be circumvented by code developers. Accordingly, there is an opportunity for improved systems and methods for protecting proprietary data, such as proprietary healthcare data.

BRIEF DESCRIPTION

Some or all of the above needs and/or problems may be addressed by certain embodiments of the disclosure. Embodiments of the disclosure may include systems and methods for protecting proprietary or confidential data. In one embodiment, a method for protecting proprietary data may be provided. A file of computer-executable code that facilitates the processing of proprietary information when executed by at least one processor may be identified by a computing system that includes one or more computers. At least one hashing operation may be performed by the computing system on the file to generate a first representative value associated with the file. At least one approval associated with validation of the file may be received by the computing system. The at least one approval may be stored by the computing system in association with the generated representative value. Prior to the execution of the file, the computing system may utilize the at least one hashing operation to determine a second representative value associated with the file. Execution of the file may be selectively permitted by the computing system based at least in part upon a determination of whether the second representative value matches the stored first representative value and whether the at least one approval is available.

In accordance with another embodiment, a system may be provided. The system may include at least one memory and at least one processor. The at least one memory may be operable to store computer-executable instructions. The at least one processor may be configured to access the at least one memory and execute the computer-executable instructions to: identify a file of computer-executable code that facilitates the processing of proprietary information when executed by at least one processor; perform at least one hashing operation on the file to generate a first representative value associated with the file; receive at least one approval associated with validation of the file; store the at least one approval in association with the generated representative value; determine, prior to the execution of the file and utilizing the at least one hashing operation, a second representative value associated with the file; and selectively permit execution of the file based at least in part upon a determination of whether the second representative value matches the stored first representative value and whether the at least one approval is available.

According to yet another embodiment, a method for protecting proprietary data may be provided. A file of computer-executable code may be identified by a computing system that includes one or more computers. Prior to the execution of the file and based upon the performance of at least one hashing operation on the file, a representative value associated with the file may be determined by the computing system. Stored representative value information previously generated utilizing the at least one hashing operation may be accessed by the computing system. The computing system may then determine whether the generated representative value corresponds to the stored representative value The computing system may also determine whether at least one approval associated with the validation of the file is stored in association with the stored representative value. Based at least in part upon the determinations of whether the generated representative value corresponds to the stored representative value and whether the at least one approval is stored, the computing system may selectively permit execution of the file.

Additional systems, methods, apparatus, features, and aspects may be realized through the techniques of various embodiments of the invention. Other embodiments and aspects of the invention are described in detail herein with reference to the description and to the drawings and are considered a part of the claimed invention.

BRIEF DESCRIPTION OF THE DRAWINGS

Reference will now be made to the accompanying drawings, which are not necessarily drawn to scale, and wherein.

DETAILED DESCRIPTION

Embodiments of the disclosure now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments of the disclosure may include systems, methods, and apparatus for protecting proprietary data, such as proprietary or confidential healthcare data. In certain embodiments, one or more security mechanisms may be associated with data delivery projects. These data delivery projects may include or rely upon one or more files of executable code (e.g., files including computer-executable instructions, etc.), such as scripts, plug-in modules, and/or other files. For example, a file may be created by a programmer or a technician in order to generate a report or other deliverable that includes proprietary healthcare information. As another example, a file may be created that processes received or stored healthcare information. A wide variety of different types of files and/or data delivery projects may be utilized, such as one time or ad-hoc queries of healthcare information (e.g., healthcare claim transactions, eligibility requests, etc.) and/or data feeds established to deliver healthcare information in a recurring manner.

In one example embodiment, a file that facilitates the processing of proprietary information may be identified. For example, the generation or preparation of a new file or project may be tracked. As another example, the modification of an existing file or project may be tracked. Once a file has been identified, a project review and/or validation component may process the file in order to generate a first representative value for the file. For example, at least one hashing operation, compression function, or other operation (or combination of operations) may be performed on the file in order to generate a first representative value for the file. Additionally, one or more approvals and/or authorizations may be obtained for the file. For example, any number of users (e.g., a programmer, a supervisor of the programmer, etc.) may be prompted and/or required to complete review checklists and/or other reviews for the file. In conjunction with the completion of the reviews, one or more approvals, such as electronic signatures, may be generated. The one or more electronic signatures (or other approvals) may be stored in association with the generated first representative value.

Once a file has been generated, the file may be executed in order to process proprietary information and/or to generate one or more data deliverables that may be provided to recipients (e.g., healthcare providers, claims processors, etc.). In certain embodiments, a file may be executed in accordance with various scheduling information. For example, a file may be scheduled to execute at predetermined points in time. Alternatively, a file may be executed in response to a request or based upon the identification of a predetermined event. Prior to the execution of the file and/or the provision of a data deliverable to a recipient, one or more security validations may be performed. For example, a determination may be made as to whether adequate approvals (e.g., electronic signatures, etc.) are stored for the file.

In one example embodiment, prior to permitting a file to execute, the file may be processed in order to generate a second representative value for the file. As desired, the same hashing operation or other operation(s) utilized to determine the first representative value may be utilized to determine the second representative value. A determination may then be made as to whether the second representative value matches or corresponds to the stored first representative value. For example, the second representative value may be utilized to access a database or other data repository containing stored representative values, and a determination may be made as to whether a corresponding stored representative value is available. In this regard, a determination may be made as to whether the file has been modified or altered following the storage of the first representative value. If it is determined that the second representative value matches or corresponds to a previously stored first representative value, then a determination may be made as to whether adequate approval information (e.g., one or more stored electronic signatures, etc.) is available for the file and stored in association with the first representative value. In the event that adequate approval information is available, execution of the file may be permitted. Otherwise, if adequate approval information is not available, then execution of the file may be prevented. As desired, one or more alert messages and/or other control actions may also be taken if adequate approval information is not available or if the file is determined to have been modified. As a result, additional security may be provided for proprietary and/or confidential information associated with the file.

System Overview

Figure 1:
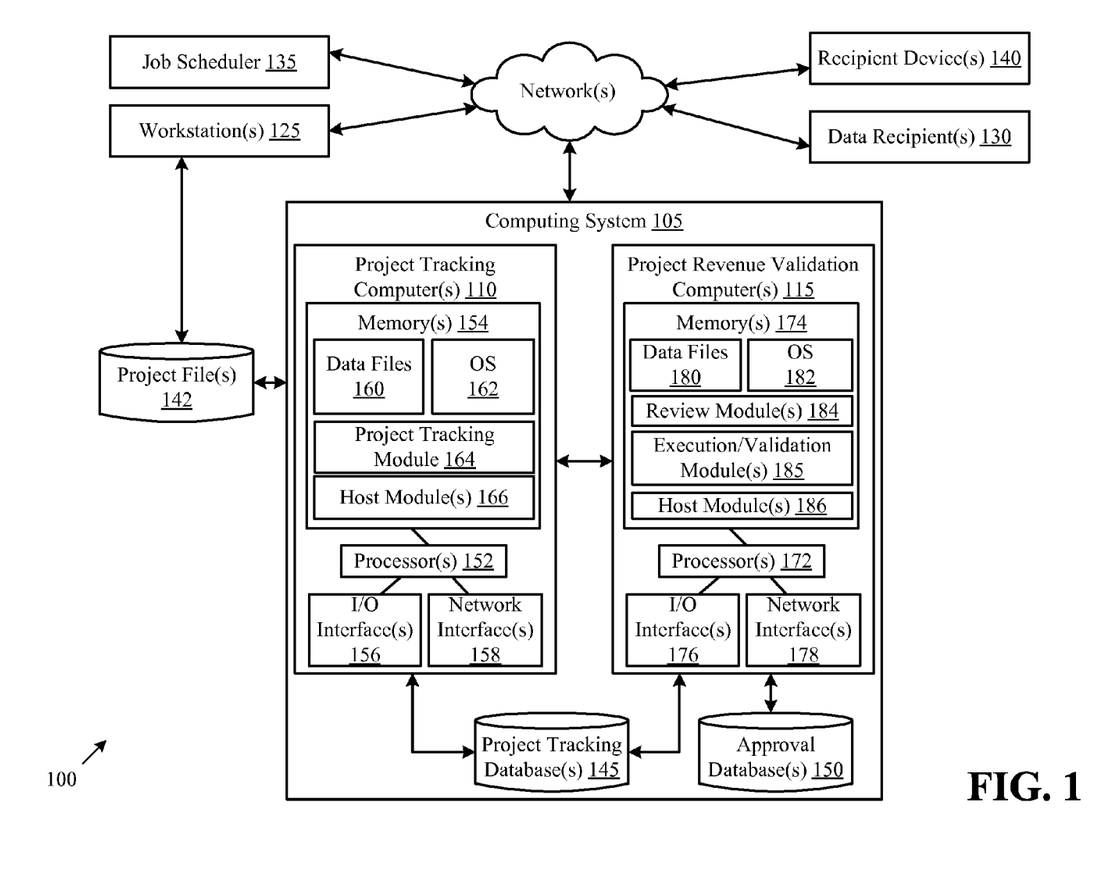
FIG. 1 illustrates an example overview of a system that may facilitate the evaluation and protection of proprietary data, according to an example embodiment of the disclosure.

An example system 100 that facilitates the evaluation and protection of proprietary data will now be described illustratively with respect to FIG. 1. As shown in FIG. 1, the system 100 may include at least one computing system 105 that facilitates project management, project review, and/or project validation. In certain embodiments, the computing system 105 may include one or more project tracking computers 110 and/or one or more project review/validation computers 115. Additionally, the computing system 105 may be in communication with any number of other devices and/or systems via one or more suitable networks 120. For example, the computing system 105 may be in communication with one or more workstations 125, one or more data recipients 130, one or more job scheduler devices 135, and/or one or more recipient devices 140. As desired, each of the computing system 105, workstations 125, data recipients 130, and/or recipient devices 140 may include one or more processing devices that may be configured for accessing and reading associated computer-readable media having stored thereon data and/or computer-executable instructions for implementing the various methods and/or operations described herein.

In one example implementation of the system 100, a technician or other individual may utilize a workstation 125 to generate or develop a file (or multiple files) or a data delivery project, such as an ad-hoc query of healthcare information, a recurring data feed, a plug-in that evaluates healthcare information, a script that evaluates healthcare information, or other computer-executable code that may be utilized to evaluate or process healthcare or other proprietary information. Once generated, the file or project may be stored in any number of suitable memory locations, such as a project files database 142. As desired, during the development of the file or project, the project may be tracked, and the project tracking computers 110 may store project tracking information in one or more suitable project tracking databases 145.

Once the file or project has been completed, the project review/validation computers 115 may collect approval information associated with the file or project. Alternatively, the project tracking computers 110 may collect the approval information and provide the approval information to the project review/validation computers 115. In certain embodiments, project tracking information and/or any number of checklists may be provided to one or more individuals (e.g., a programmer, a supervisor of the programmer, a secondary reviewer, etc.). For example, one or more checklists (or other project review information) may be provided to workstations 125 associated with reviewers. In this regard, file and/or project review information may be collected and evaluated. Additionally, once adequate review information has been collected and/or verified, project approval information may be stored for subsequent evaluation during the execution of a file or project. For example, respective electronic signatures and/or other approval information may be generated for the various reviewers of a project. Additionally, the approval information may be stored, for example, in one or more approval databases 150. In certain embodiments, the approval information may be stored in association with a representative value (e.g., a hash value, etc.) associated with the file or project. The approval information and the representative value may subsequently be accessed and evaluated in order to determine whether a file or project may be executed. For example, the job scheduler 135 may specify a time at which the file should be executed, and a validation determination may be performed at the execution time. In the event that appropriate approvals are available for a file, the file may be executed in order to process proprietary data and/or to generate a data deliverable to be communicated to a data recipient 130, such as a healthcare provider system (e.g., a pharmacy computer, a pharmacy chain computer, a hospital computer, etc.).

Generally, network devices and systems, including one or more of the computing system 105, the workstations 125, the data recipients 130, the job scheduler 135, and/or the recipient devices 140 may include or otherwise be associated with suitable hardware and/or software for transmitting and receiving data, signals, and/or computer-executable instructions over one or more communications links or networks. As desired, these network devices and systems may also include any number of processors for processing data and executing computer-executable instructions, as well as other internal and peripheral components that are well-known in the art. Further, these network devices and systems may include or may be in communication with any number of suitable memory devices operable to store data and/or computer-executable instructions. By executing computer-executable instructions, each of the network devices may form a special-purpose computer or particular machine. As used herein, the term "computer-readable medium" describes any form of suitable memory or memory device.

As shown in FIG. 1, the computing system 105, the workstations 125, the data recipients 130, the job scheduler 135, and/or the recipient devices 140 may be in communication with each other via one or more networks, such as networks 120, which as described below can include one or more separate or shared private and public networks, including the Internet and/or a publicly switched telephone network. Each of these components—the computing system 105, the workstations 125, the data recipients 130, the job scheduler 135, and/or the recipient devices 140—will now be discussed in further detail.

The computing system 105 may include any number of suitable computing and/or processing devices. Additionally, in certain embodiments, the computing system 105 may be associated with a suitable service provider that processes healthcare information. For example, the computing system 105 may be associated with a suitable healthcare switching service provider that processes and routes healthcare transactions (e.g., prescription claim transactions, Medicare transactions, eligibility requests, prescription requests, etc.) between various healthcare systems, such as healthcare provider computers (e.g., pharmacy computers, hospital computers, physician computers, etc.) and third-party processors (e.g., claims processors, prescription benefits managers, etc.). As such, the computing system 105 may be configured to collect and/or store a wide variety of healthcare information. The collected information may be utilized as desired to generate a wide variety of different types of data deliverables, such as ad-hoc queries and/or data feeds prepared on behalf of customers of the computing system 105 (e.g., healthcare providers, third-party processors, etc.). For purposes of this disclosure, the preparation of a data deliverable may be referred to as a project, and one or more files may be generated in order to facilitate the preparation of a data deliverable. Additionally or alternatively, one or more files or projects may be prepared in order to facilitate internal processing or other processing of information (e.g., healthcare information) that does not result in a data deliverable. As described herein, one or more project control processes may be implemented by the service provider to provide security for confidential healthcare information, to govern the preparation and/or completion of a project, and/or to govern the execution of a file or project.

With continued reference to FIG. 1, any number of project tracking computers 110 may be included in the system 100. A project tracking computer 110 may be any suitable processor-driven device that facilitates the tracking of files or projects and/or the storage of tracking information associated with the files or projects. For example, the project tracking computer 110 may be a server computer, a mainframe computer, one or more networked computers, a desktop computer, a personal computer, a digital assistant, a personal digital assistant, a digital tablet, an Internet appliance, an application-specific circuit, a microcontroller, a minicomputer, or any other processor-based device. The execution of computer-implemented instructions by the project tracking computer 110 may form a special purpose computer or other particular machine operable to facilitate the tracking of files or projects, as well as the storage of tracking information associated with the files or projects. Additionally, in certain embodiments, the operations and/or control of the project tracking computer 110 may be distributed among several processing components.

In addition to having one or more processors 152, the project tracking computer 110 may include one or more memory devices 154, one or more input/output ("I/O") interface(s) 156, and/or one or more network interface(s) 158. The memory devices 154 may include any suitable memory devices, for example, caches, read-only memory devices, random access memory devices, magnetic storage devices, removable storage devices, etc. The memory devices 154 may store data, executable instructions, and/or various program modules utilized by the project tracking computer 110, for example, data files 160, an operating system ("OS") 162, a project tracking module 164, and/or one or more host modules 166. The data files 160 may include any suitable data that facilitates the receipt of project information, the tracking of projects, and/or the storage and/or access of project tracking information. For example, the data files 160 may include, but are not limited to, control process checkpoints and/or parameters associated with project development, implementation, documentation, and/or completion, forms and/or interfaces that facilitate the entry of project tracking information, and/or received project tracking information. The OS 162 may be a suitable software module that controls the general operation of the project tracking computer 110. The OS 162 may also facilitate the execution of other software modules by the one or more processors 152, for example, the project tracking module 164 and/or the host modules 166. The OS 162 may be, but is not limited to, Microsoft Windows®, Apple OSX™, Linux, Unix, or a mainframe operating system.

Each host module 166 may be a suitable program or processing module, such as a Web server module, that facilitates the hosting of communications sessions with other components of the system 100. For example, a host module 166 may facilitate the establishment of a communications session with a workstation 125 in order to receive project tracking information associated with a project. In certain embodiments, a host module 166 may facilitate the establishment of a communications session with a workstation 125 in order to provide project tracking information to the workstation 125 in association with a review of a project that is being completed. In this regard, review and/or approval information may be collected by the project tracking computers 110 and, as desired, provided to the project review/validation computers 115 and/or stored in the approval databases 150. Alternatively, as described below, the project review/validation computers 115 may facilitate project reviews and/or the collection of approval information.

The project tracking module 164 may be a suitable software module or application that facilitates the storage and/or management of project tracking information. In operation, the project tracking module 164 may receive information associated with a project from one or more workstations 125, and the project tracking module 164 may direct the storage of tracking information in one or more suitable project tracking databases 145. A wide variety of tracking information may be stored as desired in various embodiments, such as information associated with a plurality of steps or checkpoints associated with the completion of a project and/or a project control process. As desired, any number of checkpoints may be associated with a project control process. One example project control process is described in greater detail below with reference to FIG. 3; however, other processes may be utilized as desired.

In certain embodiments, the project tracking module 164 may additionally control the management of generating a file or project. For example, the project tracking module 164 may provide directions and/or checkpoint information to the one or more workstations 125 during the development of the project. In certain embodiments, a suitable Web application may be utilized to provide directions to a workstation 125. Additionally, during the development and/or completion of the project, the project tracking module 164 may store project documentation, notes, critical date information, and/or other project tracking information in the databases 145. For example, in certain embodiments, the project tracking module 164 may manage the various checkpoints and store information as the checkpoints are achieved. In this regard, information that permits a subsequent review of the project may be stored. In one example embodiment, the project tracking module 164 may utilize a suitable project portfolio management ("PPM") application that facilitates the collection of project tracking information.

Additionally, in certain embodiments, the project tracking module 164 may be configured to collect approval and/or validation information associated with a file or project. For example, the project tracking module 164 may provide stored project tracking information to one or more other components of the system 100, such as one or more workstations 125, to facilitate completion of a project review. Alternatively, the project tracking module 164 may provide project tracking information to the project review/validation computers 115, and the project review/validation computers 115 may then provide the tracking information to one or more workstations 125 to complete one or more reviews. During the completion of a review, a reviewer (e.g., a programmer of a project, a programmer's supervisor, another reviewer, etc.) may utilize a workstation 125 to access a host module 166 associated with the project tracking computer 110. During a communications session established between the workstation 125 and the project tracking computer 110, the project tracking module 164 may provide project tracking information that may be utilized by a reviewer to complete a review. The reviewer may then complete any number of checklists and/or provide other input associated with the review of the project. Additionally, once a review has been completed (e.g., desired information and/or approvals have been collected from a reviewer), approval information may be generated in association with the reviewer and the project. A wide variety of suitable approval information may be generated as desired in various embodiments, such as an electronic signature or a digital certificate. Additionally, approval information may be stored by the project tracking computers 110 or the project review/validation computers 115 in the approval databases 150. As desired, multiple instances of approval information may be stored in association with a file or project. Additionally, as explained in greater detail below with reference to the project review/validation computers 115, approval information may be stored in association with a representative value for a file or project.

With continued reference to the project tracking computer 110, the one or more I/O interfaces 156 may facilitate communication between the project tracking computer 110 and one or more input/output devices, for example, one or more user interface devices, such as a display, keypad, control panel, touch screen display, remote control, microphone, etc., that facilitate user interaction with the project tracking computer 110. The one or more network interfaces 158 may facilitate connection of the project tracking computer 110 to one or more suitable networks, for example, the networks 120 illustrated in FIG. 1. In this regard, the project tracking computer 110 may receive and/or communicate information to other components of the system 100, such as the workstations 125.

With continued reference to FIG. 1, any number of project review/validation computers 115 may be provided. A project review/validation computer 115 may be any suitable processor-driven device that facilitates the identification of projects to be reviewed, the calculation of review and/or approval information, and/or the validation of files or projects before the files are permitted to be executed. For example, the project review/validation computer 115 may be a server computer, a mainframe computer, one or more networked computers, a desktop computer, a personal computer, a digital assistant, a personal digital assistant, a digital tablet, an Internet appliance, an application-specific circuit, a microcontroller, a minicomputer, or any other processor-based device. The execution of computer-implemented instructions by the project review/validation computer 115 may form a special-purpose computer or other particular machine operable to facilitate the collection of review and/or approval information, as well as the use of collected approval information to selectively permit the execution of a file or project. In this regard, the project review/validation computer 115 may provide additional security to proprietary information associated with various files or projects. Additionally, in certain embodiments, the operations and/or control of the project review/validation computer 115 may be distributed among several processing components.

In addition to having one or more processors 172, the project review/validation computer 115 may include one or more memory devices 174, one or more input/output ("I/O") interface(s) 176, and/or one or more network interface(s) 178. The memory devices 174 may be any suitable memory devices, for example, caches, read-only memory devices, random access memory devices, magnetic storage devices, removable storage devices, etc. The memory devices 174 may store data, executable instructions, and/or various program modules utilized by the project review/validation computer 115, for example, data files 180, an operating system ("OS") 182, one or more review modules 184, one or more execution/validation modules 185, and/or one or more host modules 186. The data files 180 may include any suitable data that facilitates the identification of one or more projects, the completion of project reviews, the generation of approval information, the generation of representative values, the storage of approval information and representative values, and/or the selective execution of projects. For example, the data files 180 may include, but are not limited to, identification information for various files or projects, checkpoint information and/or review parameters, review form information, rules and/or algorithms for conducting reviews, review result information, approval information (e.g., electronic signatures, digital certificates, etc.), hash functions and/or other algorithms utilized to generate representative values, and/or various representative values. The OS 182 may be a suitable software module that controls the general operation of the project review/validation computer 115. The OS 182 may also facilitate the execution of other software modules by the one or more processors 172, for example, the review modules 184, the execution/validation modules 185, and/or the host modules 186. The OS 182 may be, but is not limited to, Microsoft Windows®, Apple OSX™, Linux, Unix, or a mainframe operating system.

Each host module 186 may be a suitable program or processing module, such as a Web server module, that facilitates the hosting of communications sessions with other components of the system 100. For example, a host module 186 may facilitate the establishment of a communications session with a workstation 125 in order to provide review forms and/or project tracking information to the workstation 125 and/or to collect review information from the workstation 125.

The review modules 184 may include any number of suitable software modules or applications that facilitate the identification of a project to be reviewed, the generation of checklist and/or other prompts for review information, the collection of review information, the generation of approval information, and/or the storage of review information. In one example operation, the review modules 184 may provide stored project tracking information to one or more workstations 125 to facilitate completion of a project review. During the completion of a review, a reviewer (e.g., a programmer of a project, a programmer's supervisor, another reviewer, etc.) may utilize a workstation 125 to access a host module 186 associated with the project review/validation computer 115. During a communications session established between the workstation 125 and the project review/validation computer 115, the review modules 184 may provide project tracking information and prompts for review information to the workstation 125 for presentation to the reviewer. The reviewer may then complete any number of checklists and/or provide other input associated with the review of the project.

Once a review has been completed (e.g., desired information and/or approvals have been collected from a reviewer), approval information may be generated in association with the reviewer and the project. A wide variety of suitable approval information may be generated as desired in various embodiments, such as an electronic signature or a digital certificate. Additionally, approval information may be stored by the project review/validation computers 115 in the approval databases 150. As desired, multiple instances of approval information may be stored in association with a file or project. For example, respective reviews may be completed by any number of reviewers.

Additionally, approval information collected from and/or generated in association with one or more reviewers may be stored in association with a representative value for a file or project. In certain embodiments, the review modules 184 (or the execution/validation modules 185) may generate or determine a representative value for a file or project. A wide variety of suitable methods and/or techniques may be utilized to determine a representative value for a file. For example, one or more hashing operations may be performed on a file to generate a representative value. Any number of suitable hash functions may be utilized as desired including, but not limited to, SHA-128, SHA-256, MD4, MD5, MD6, BLAKE-256, ECOH, FSB, GOST, HAVAL, Spectral Hash, any other cryptographic hash functions, and/or any suitable non-cryptographic hash function. As another example of generating a representative value, any number of suitable compression functions may be utilized to process the file to generate a representative value. Regardless of the technique utilized to generate a representative value, the representative value may include data that identifies a version of the file at the time the representative value is generated. Thus, in the event that the file is modified, a different representative value would be generated. One example of the operations that may be performed by the review modules 184 are described in greater detail below with reference to FIG. 4.

The execution/validation modules 185 may include any number of suitable software modules and/or applications that facilitate the validation of a file or project prior to the file or project being executed. In certain embodiments, the execution/validation modules 185 may verify that appropriate approval information (e.g., electronic signatures, etc.) is available for a file or project and that the file or project has not been modified following the storage of the approval information. In this regard, the execution/validation modules 185 may mitigate the introduction of non-approved automation into a client environment.

In operation, the execution/validation modules 185 may determine a point in time at which a file or project should be executed. For example, a job scheduler 135 may attempt to invoke the execution of a file or project in accordance with scheduling information. As another example, the execution/validation modules 185 may utilize scheduling information to identify a point in time at which a file should be executed. As desired, a file may be executed at periodic points in time, in response to a request for a report or other proprietary information, and/or based upon the occurrence of a predetermined event. Once an execution time has been identified or determined, the execution/validation modules 185 may generate a second representative value for the file. As desired, the same hashing operation or other operation(s) utilized to determine the first representative value (e.g., the representative value stored in association with approval information) may be utilized to determine the second representative value.

The execution/validation modules 185 may then determine whether the second representative value matches or corresponds to the stored first representative value. For example, the second representative value may be utilized to access the approval databases 150, and a determination may be made as to whether a corresponding stored first representative value is available. In this regard, a determination may be made as to whether the file has been modified or altered following the storage of the representative value. If it is determined that the file has been modified (or that a stored first representative value does not match the second representative value), then execution of the file may be prevented. Otherwise, if it is determined that the second representative value matches or corresponds to a previously stored first representative value, then a determination may be made as to whether adequate approval information (e.g., one or more stored electronic signatures, etc.) is available for the file and stored in association with the first representative value. In the event that adequate approval information is available, execution of the file may be permitted. Otherwise, if adequate approval information is not available, then execution of the file may be prevented. As desired, one or more alert messages may be generated and/or other control actions may be taken if adequate approval information is not available or if the file is determined to have been modified. As a result, additional security may be provided for proprietary and/or confidential information associated with the file.

In the event that appropriate approvals are available for a file, the file may be executed in order to process proprietary data and/or to generate a data deliverable to be communicated to a data recipient 130, such as a healthcare provider system (e.g., a pharmacy computer, a pharmacy chain computer, a hospital computer, etc.). Alternatively, the file may be executed for other purposes, such as the internal processing of healthcare or other proprietary information. One example of the operations of the execution/validation modules 185 is described in greater detail below with reference to FIG. 5.

With continued reference to the project review/validation computer 115, the one or more I/O interfaces 176 may facilitate communication between the project review/validation computer 115 and one or more input/output devices, for example, one or more user interface devices, such as a display, keypad, control panel, touch screen display, remote control, microphone, etc., that facilitate user interaction with the project review/validation computer 115. The one or more network interfaces 178 may facilitate connection of the project review/validation computer 115 to one or more suitable networks, for example, the networks 120 illustrated in FIG. 1. In this regard, the project review/validation computer 115 may receive and/or communicate information to other network components of the system 100, such as the workstations 125 and/or the job scheduler 135.

Although the project tracking computers 110 and the project review/validation computers 115 are described as separate devices, in certain embodiments, one or more operations of the project tracking computers 110 and the project review/validation computers 115 may be performed by a single computing device. Alternatively, the operations described for the project tracking computers 110 and the project review/validation computers 115 may be distributed among additional computing systems.

With continued reference to FIG. 1, any number of workstations 125 may be included in the system 100. Each workstation 125 may be a suitable processor-driven device that facilitates the development of data delivery files and/or projects. As such, a workstation 125 may include components similar to those described above for the project tracking computers 110 and/or the project review/validation computers 115. For example, a workstation 125 may include any number of processors, memory devices, I/O interfaces, and/or network interfaces. In operation, a technician or programmer may utilize a workstation 125 to generate or produce a file or data delivery project. For example, the workstation 125 may be utilized to access stored healthcare information and prepare a data deliverable. As another example, the workstation 125 may be utilized to prepare a script or plug-in that processes healthcare information. During the generation of a file, the workstation 125 may provide tracking information, such as checkpoint tracking and project documentation, to the project tracking computers 110. In this regard, the project may be tracked, and subsequent reviews may be performed. Additionally, once a project has been completed, one or more files associated with the project may be stored in the project files database 142. In this regard, project information may be accessed for review purposes and/or for generation of approval information. Additionally, files may be accessed for execution in order to process healthcare information and/or to prepare a data deliverable.

Additionally, workstations 125 may be utilized by any number of suitable individuals to facilitate the review of a project. A workstation 125 may be utilized to access and/or receive project tracking information associated with a project. During the completion of a review, the workstation 125 may facilitate the entry of review information that is provided to the project review/validation computers 115. Once a review has been completed, the results of the review may be stored. Additionally, approval information (e.g., an electronic signature, etc.) may be stored.

With continued reference to FIG. 1, any number of data recipients 130 may be included in the system 100. Each data recipient 130 may be a suitable processor-driven device configured to receive information associated with data delivery projects. As such, a data recipient 130 may include components similar to those described above for the project tracking computers 110 and/or the project review/validation computers 115. For example, a data recipient 130 may include any number of processors, memory devices, I/O interfaces, and/or network interfaces. In operation, a data recipient 130 may be configured to receive a data deliverable prepared in conjunction with a project. For example, a data deliverable may be received from a workstation 125 or from another service provider system that accesses and executes a file or project. In certain embodiments, a data deliverable may be a one time deliverable, such as the results of an ad-hoc query. In other embodiments, a data deliverable may be a data feed that is received in a recurring manner.

Additionally, any number of job schedulers 135 may be included in the system 100. Each job scheduler 135 may be a suitable processor-driven device configured to schedule the execution of files and/or projects. As such, a job scheduler 135 may include components similar to those described above for the project tracking computers 110 and/or the project review/validation computers 115. For example, a job scheduler 135 may include any number of processors, memory devices, I/O interfaces, and/or network interfaces. In operation, a job scheduler 135 may be configured to maintain job scheduling information and/or to process requests to execute a file or project (or requests associated with the delivery or processing of healthcare information). In this regard, the job scheduler 135 may identify a point in time at which a file or project should be executed. The job scheduler 135 may then request approval to execute the file or project from the project review/validation computers 115. Alternatively, the job scheduler 135 may attempt to execute the file or project, and the project review/validation computers 115 may evaluate the file or project prior to the file or project being permitted to execute. Additionally, although the job scheduler 135 is illustrated as a separate component, in other embodiments, job scheduling functionality may be performed by the project review/validation computers 115 and/or by other components of the system 100.

During the review of files or projects to be executed, one or more messages and/or alerts associated with the processing of the execution/validation modules 185 may be generated and communicated to one or more recipient devices 140. Each recipient device 140 may be a suitable processor-driven device that facilitates the receipt of messages and/or alerts generated in association with the validation results for a file or project. As such, a recipient device 140 may include components similar to those described above for the project tracking computers 110 and/or the project review/validation computers 115. For example, a recipient device 140 may include any number of processors, memory devices, I/O interfaces, and/or network interfaces. Examples of suitable recipient devices include, but are not limited to, personal computers, portable devices, mobile devices, and the like. In certain embodiments, recipient devices may be associated with various programmers, technicians, supervisors, and/or other individuals.

The networks 120 may include any number of telecommunication and/or data networks, whether public, private, or a combination thereof, including a local area network, a public switched telephone network, a wide area network, an intranet, the Internet, intermediate handheld data transfer devices, and/or any combination thereof and may be wired and/or wireless. For example, the networks 120 may include a public switched telephone network that facilitates telephone communication between various devices within the system 100.

Due to network connectivity, various methodologies as described herein may be practiced in the context of distributed computing environments. Although certain components of the system 100 are shown for simplicity as being in communication with one another via one intervening network 120, it is to be understood that any other network configuration is possible. For example, intervening network 120 may include a plurality of networks, each with devices such as gateways and routers for providing connectivity between or among networks 120. Instead of or in addition to a network 120, dedicated communication links may be used to connect the various devices in accordance with various embodiments.

Those of ordinary skill in the art will appreciate that the system 100 shown in and described with respect to FIG. 1 is provided by way of example only. Numerous other operating environments, system architectures, and device configurations are possible. Other system embodiments can include fewer or greater numbers of components and may incorporate some or all of the functionalities described with respect to the system components shown in FIG. 1. For example, in one embodiment, the computing system 105 (or other computer) may be implemented as a specialized processing machine that includes hardware and/or software for performing the methods described herein. Accordingly, embodiments of the disclosure should not be construed as being limited to any particular operating environment, system architecture, or device configuration.

Figure 2:
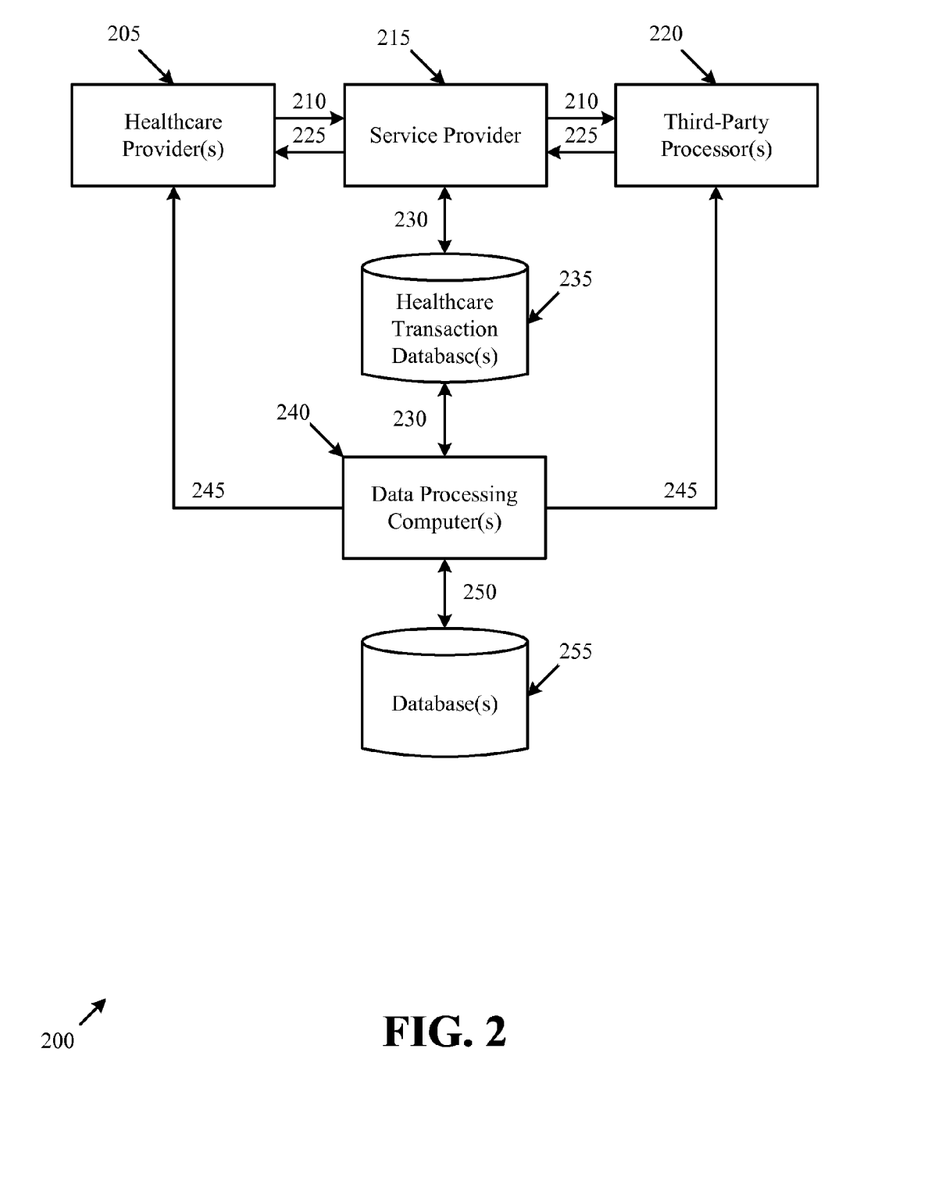
FIG. 2 illustrates a block diagram of an example system that may be utilized to generate or prepare files and/or projects relating to healthcare information, according to illustrative embodiments of the disclosure.

Embodiments of the disclosure may be utilized in conjunction with a wide variety of different applications and projects. Indeed, embodiments of the disclosure may be applicable to any file or project in which a project control process is instituted in order to protect proprietary or confidential information. For example, embodiments of the disclosure may be applicable to, but are not limited to, the evaluation of projects directed to the delivery of confidential healthcare information. FIG. 2 illustrates a block diagram of an example system 200 that may be utilized to collect healthcare information and to generate or prepare projects relating to the collected healthcare information.

With reference to FIG. 2, healthcare providers 205, such as pharmacies, hospitals, and/or physicians' offices, may generate healthcare transactions 210 (e.g., prescription claim transactions, eligibility transactions, electronic prescriptions, etc.), and the healthcare transactions 210 may be communicated to a service provider 215. In certain embodiments, the service provider 215 may be a switch/router that routes healthcare transactions and/or other healthcare requests. For example, the service provider 215 may be configured to route billing requests and/or prescription claim requests communicated from the healthcare providers 205 to designated third-party processors 220, such as claims processors (e.g., pharmacy benefits managers, insurers, Medicare payers, government payers, claims clearinghouses, etc.) and/or other healthcare providers.

Once a healthcare transaction 210 has been routed to a third-party processor 220, the healthcare transaction 210 may be processed and/or adjudicated by the third-party processor 220. For example, the third-party processor 220 may determine benefits coverage associated with a healthcare claim transaction. As another example, the third-party processor 220 may determine patient healthcare coverage eligibility. Once the healthcare transaction 210 has been processed or adjudicated, the third-party processor 220 may return a response 225 for the healthcare transaction 210 to the service provider 215. The response 225 may be processed by the service provider 215 and routed to the healthcare provider 205.

During the processing of healthcare transactions 210 and/or adjudicated responses 225, the service provider 215 may perform a wide variety of edits and/or other analysis. For example, the service provider 215 may verify data included in healthcare transactions 210 or responses 225 and/or the formatting of the healthcare transactions 210 or responses 225. Additionally, the service provider 215 may store healthcare transaction information 230 associated with the healthcare transactions 210 and/or responses 225 in any number of suitable memory devices, such as one or more healthcare transaction databases 235.

As desired, at least a portion of the stored healthcare transaction information 230 may be accessed by one or more files or projects that facilitate the internal processing of data and/or the generation of one or more data deliverables. For example, a technician or a programmer may utilize a data processing computer 240, such as one of the workstations 125 illustrated in FIG. 1, to generate a file or project that processes a portion of the stored healthcare transaction information 230. The stored healthcare transaction information 230 may be utilized, for example, to prepare a data deliverable 245, such as a report. Once prepared, the data deliverable 245 may be provided to one or more recipients, such as a healthcare provider 205 or a third-party processor 220.

Additionally, during the preparation of the files and/or projects and/or following the completion of a project, tracking information 250 associated with the project may be stored in one or more suitable databases 255. For example, project documentation, notes, and/or critical date information for the project may be stored. In certain embodiments, a PPM application or an open source issue-tracking Web application may be utilized to collect and store the project tracking information. Additionally, approval information and/or representative values associated with the project may be stored in the databases 255. As a result, the file or project may be validated prior to execution in order to provide additional security for the healthcare information.

A wide variety of various project control processes may be utilized as desired in various embodiments of the disclosure. A project control process may establish checkpoints and/or parameters that control and/or govern the development of a file or project and the execution of the file or project. In certain embodiments, the project control process may be instituted in order to enhance the security of sensitive information, such as confidential healthcare information. One example project control process 300 for preparing files and/or projects will now be described with respect to FIG. 3.

Figure 3:
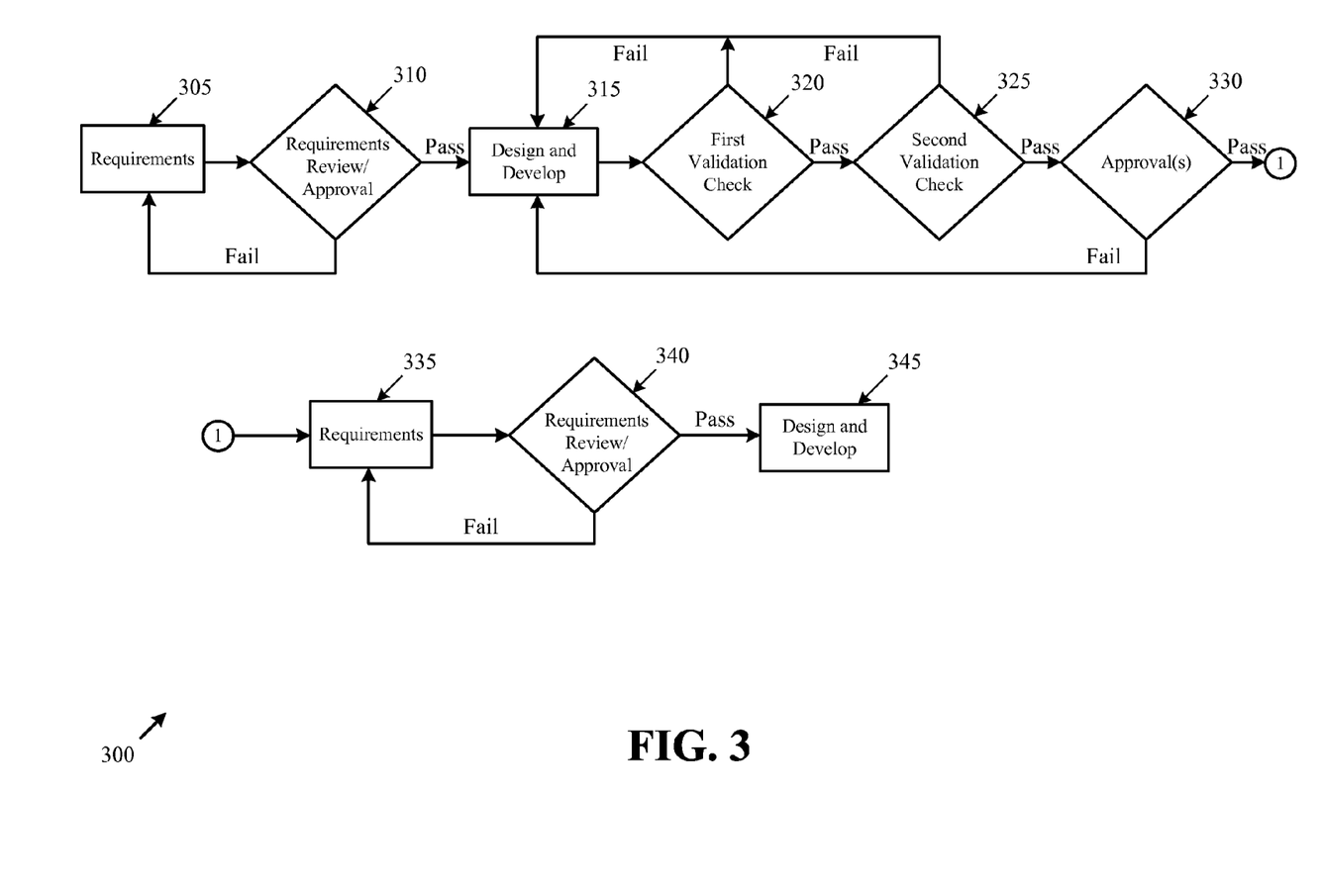
FIG. 3 is a block diagram of an example project control process for preparing files and/or projects, according to an illustrative embodiment of the disclosure.

Turning to FIG. 3, an example project control process 300 may include a plurality of checkpoints intended to mitigate risk and exposure relating to the delivery and/or processing of proprietary and/or confidential healthcare information. For example, as shown, the process 300 may include nine process steps; however, any number of steps or checkpoints may be utilized as desired in various embodiments.

First, the requirements 305 for a project may be identified and/or defined. For example, a customer request for data may be evaluated in order to identify the requirements for a project to deliver data to the customer. As another example, internal processing parameters may be evaluated in order to identify the requirements for a project. In certain embodiments, a project request form may be received, evaluated, and/or completed in order to identify the requirements for the project. As desired, the data request form and/or other requirements information may be stored in a project tracking database. Following the identification of project requirements, a project requirements review 310 may be performed in order to evaluate the project requirements, manage the project requirements, and/or evaluate cross-functional communication. In this regard, a determination may be made as to whether the project requirements are approved. In the event that the project fails to pass at the requirements review stage 310, then the project control process 300 may return to the requirements stage 305. Otherwise, the project control process 300 may continue at the design and development stage 315.

At the design and development stage 315, the project may be coded and/or otherwise developed. In other words, suitable code and/or commands for accessing or obtaining the data to be included in a data deliverable may be developed. Alternatively, a suitable code for performing internal processing of data may be developed. Additionally, in various embodiments, a wide variety of suitable approval information may be collected and stored in association with the project. For example, at a first validation check stage 320, a first individual, such as the programmer of the project, may review and/or validate the project. In certain embodiments, the first individual may review project tracking information and complete any number of review checklists for the project. In the event that the project fails to pass the review of the first individual, then the project control process 300 may return to the design and development stage 315. Otherwise, if the project passes the review of the first individual (e.g., the project is validated by the first individual, etc.), then approval information associated with the first individual may be stored in association with the project. For example, an electronic signature, a digital certificate, or other approval information may be stored for the project. In certain embodiments, the approval information may be stored in association with a representative value for the project. The project control process 300 may then continue at the second validation check stage 325.

Similar to the first validation check stage 320, in the second validation check stage 325, a second individual, such as a supervisor of the project programmer, may review and/or validate the project. In certain embodiments, the second individual may review project tracking information and complete any number of review checklists for the project. In the event that the project fails to pass the review of the second individual, then the project control process 300 may return to the design and development stage 315. Otherwise, if the project passes the review of the second individual (e.g., the project is validated by the first individual, etc.), then approval information associated with the second individual may be stored in association with the project. For example, an electronic signature, a digital certificate, or other approval information may be stored for the project. In certain embodiments, the approval information may be stored in association with the representative value for the project. The project control process 300 may then continue at the project approvals stage 330.

The project approvals stage 330, which may be optional in various implementations of the project control process 300, may include a wide variety of additional approvals for the project. As an example, quality control and analysis ("QA") of the project may be performed. As another example, a generally available ("GA") review of the project may be performed in order to determine whether a data deliverable may be provided to a customer or data recipient. As one example of a QA review, a wide variety of different quality control tests and/or operations may be performed on the project. In other words, a quality control audit may be performed. The results of the quality control audit may then be evaluated. In the event that the project fails to pass the quality control audit, then the project control process 300 may return to the design and development stage 315. Otherwise, the project control process 300 may continue at a project production stage 335.

As an example GA process, a GA quality and process control checklist may be completed for the project in order to determine whether data may be delivered to a customer. In the event that the GA review is not passed, then the project control process 300 may return to a QA review or to the design and development stage 315. Otherwise, the project control process 300 may continue at a production stage 335.

At a production stage 335, the project may be accessed for execution. For example, a scheduler may determine that a project should be executed. During execution, the project may process data and/or generate a data deliverable to be provided to a recipient. Prior to the execution of the project, a launch key verification stage 340 may determine whether valid approvals are available for the project. For example, the launch key verification stage 340 may determine whether the project has been modified subsequent to the storage of approval information and/or whether the project has been approved. If the project fails to pass the launch key verification stage 340, then the project control process 300 may return to the production stage 335 (or another stage). Additionally, one or more alerts may be generated. If, however, the project passes the launch key verification stage 340, then the project control process 300 may continue at a delivery stage 345. At the delivery stage 345, the project may be executed, and a data deliverable may be generated and delivered to a customer. Alternatively, the project may be executed in order to otherwise process proprietary information.

At each step of the process 300, a wide variety of information associated with the project may be tracked. Additionally, approval information for the project may be collected and stored. The tracking and approval information may then be utilized to determine whether the project may be executed in order to process proprietary information and/or to deliver proprietary information to a recipient. As a result of maintaining tracking and approval information, additional security may be provided by the project control process 300.

Operational Overview

Figure 4:
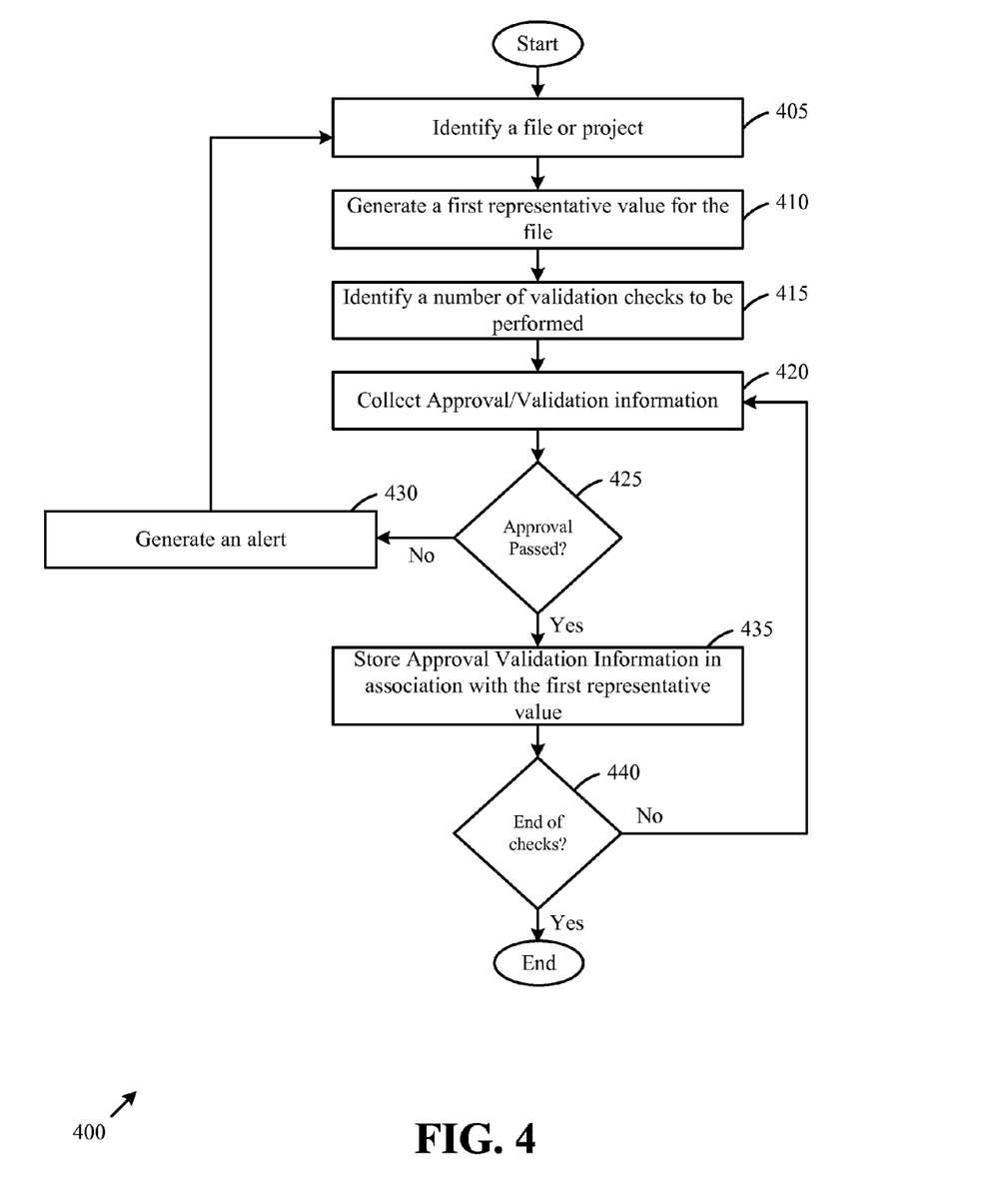
FIG. 4 is a flow diagram of an example method for storing approval information associated with a file or project, according to an illustrative embodiment of the disclosure.

FIG. 4 is a flow diagram of an example method 400 for storing approval information associated with a file or project, according to an illustrative embodiment of the disclosure. In certain embodiments, the method 400 may be performed by a suitable project review/validation computer and/or review modules, such as the project review/validation computer 115 and/or review modules 184 illustrated in FIG. 1. Alternatively, the method 400 may be performed by a suitable project tracking computer, such as the project tracking computer 110 illustrated in FIG. 1. The method 400 may begin at block 405.

At block 405, a file or project may be identified for collection of approval information. For example, a new file or project that has been generated or prepared by a programmer or a technician may be identified. As another example, an existing file or project that has been modified may be identified. Once the file has been identified, operations may continue at block 410, and a first representative value for the file may be generated or determined. A wide variety of suitable methods and/or techniques may be utilized as desired to generate a first representative value. For example, one or more suitable hashing operations may be utilized to process the file (e.g., all of the data in the file, substantially all of the data in the file, etc.) in order to generate a first representative value (e.g., a hash value) associated with the file. As another example, one or more suitable compression functions may be utilized to process the file in order to generate a first representative value for the file. As yet another example, a modulation operation or other operation may be utilized to process the file in order to generate a first representative value for the file.

At block 415, a number of validation checks and/or approval checks to be performed in association with the file may be identified. As desired in various embodiments, any number of validation checks or reviews may be performed. At block 420, approval and/or validation information may be collected from a reviewer in association with the file. For example, approval and/or validation information may be collected via one or more review checklists based at least in part upon the reviewer reviewing project tracking information.

At block 425, a determination may be made as to whether the reviewer approval has passed. In other words, a determination may be made as to whether the reviewer has approved the file and/or whether required information has been collected in association with the review. If it is determined at block 425 that the approval has not passed, then operations may continue at block 430. At block 430, one or more suitable alerts associated with the failed review may be generated. The generated alert(s) may then be provided to any number of suitable recipients, such as the reviewer, a supervisor of the reviewer, or another recipient. As desired, additional development of the project may be performed, and operations may then continue at block 405.

If, however, it is determined at block 425 that the approval has passed, then operations may continue at block 435. At block 435, approval validation information associated with the project and the reviewer may be stored. For example, an electronic signature, a digital certificate, or other approval information may be stored. Additionally, the approval information may be stored in association with the first representative value generated for the file. In this regard, the approval information may be accessed and evaluated prior to the execution of the file.

At block 440, a determination may be made as to whether an end of the validation or approval checks has been reached. In other words, a determination may be made as to whether additional approvals should be obtained for the file. If it is determined at block 440 that the end of the validation checks has not been reached, then operations may continue at block 420, and additional approval/validation information may be collected. For example, additional approval information may be collected from another individual or reviewer. If, however, it is determined at block 440 that the end of the validation checks has been reached, then the method 400 may end.

Figure 5:
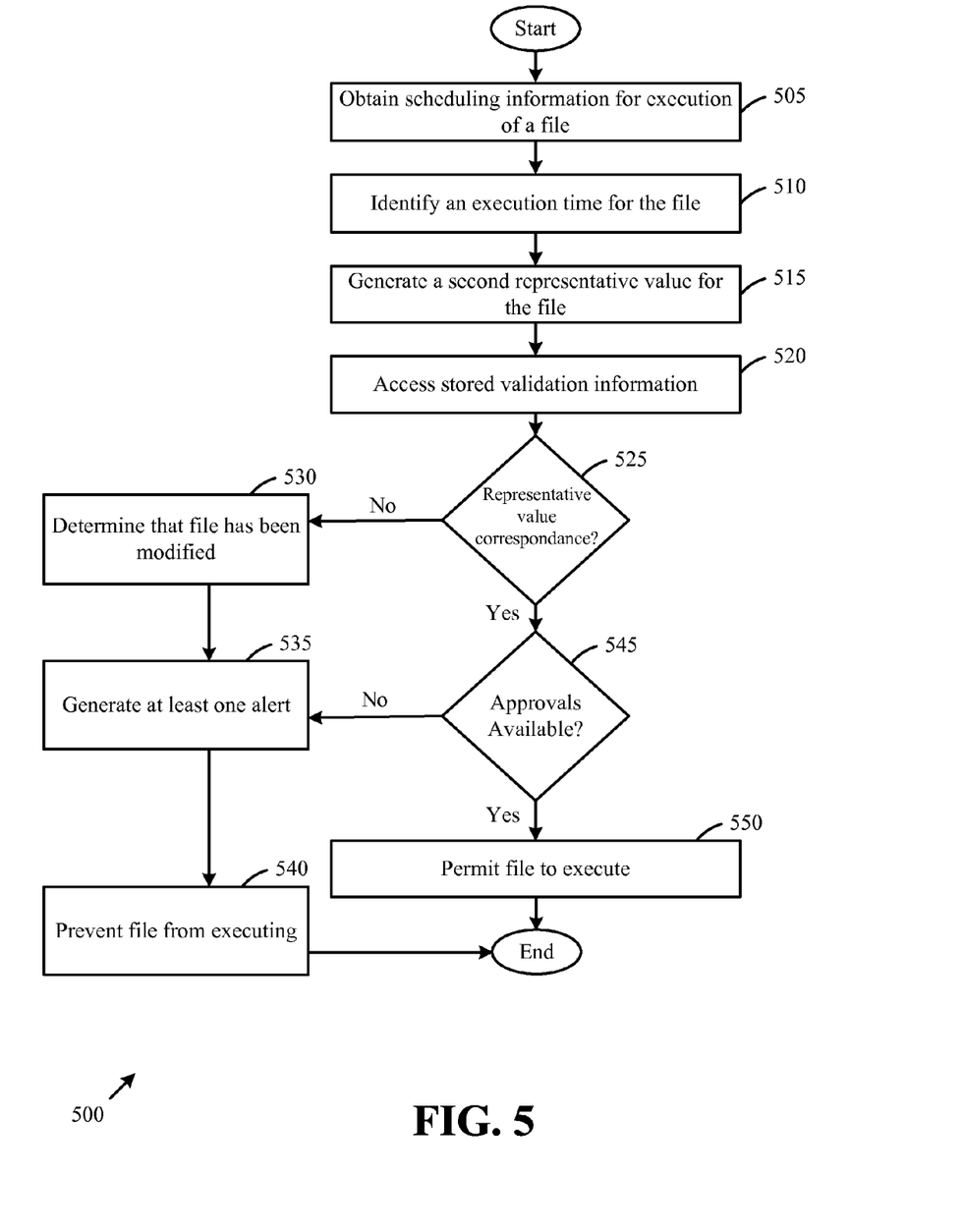
FIG. 5 is a flow diagram of an example method for determining whether a file may be executed and/or whether a deliverable may be communicated to a recipient, according to an illustrative embodiment of the disclosure.

FIG. 5 is a flow diagram of an example method 500 for determining whether a file may be executed and/or whether a deliverable may be communicated to a recipient, according to an illustrative embodiment of the disclosure. In certain embodiments, the method 500 may be performed by a suitable project review/validation computer and/or execution/validation modules, such as the project review/validation computer 115 and/or execution/validation modules 185 illustrated in FIG. 1. The method 500 may begin at block 505.

At block 505, scheduling information associated with the execution of a file or project may be obtained. The scheduling information may then be evaluated or analyzed in order to identify an execution time for the file at block 510. Alternatively, an execution time may be identified based at least in part upon the processing of an execution request or the identification of a predetermined execution event. As yet another alternatively, a scheduling system or other device may attempt to execute the file. Prior to the execution, a review of the file may be performed in order to determine whether appropriate approvals are available for the file.

At block 515, a second representative value may be generated for the file. A wide variety of suitable methods and/or techniques may be utilized as desired to generate the second representative value. For example, one or more suitable hashing operations may be utilized to process the file (e.g., all of the data in the file, substantially all of the data in the file, etc.) in order to generate a second representative value (e.g., a hash value) associated with the file. As another example, one or more suitable compression functions may be utilized to process the file in order to generate a second representative value for the file. As yet another example, a modulation operation or other operation may be utilized to process the file in order to generate a second representative value for the file. In one aspect, the same method or technique may be utilized to generate the second representative value as that utilized in the method 400 of FIG. 4 to generate the first representative value for the file.

At block 520, stored validation and/or approval information may be accessed. In certain embodiments, the second representative value may be utilized to access a data store containing stored validation and/or approval information. In other embodiments, a filename or other file identifier may be utilized to access a data store containing stored validation and/or approval information. At block 525, a determination may be made as to whether a stored first representative value for the file matches or corresponds to the generated second representative value for the file. If it is determined at block 525 that a stored first representative value matches or corresponds to the generated second representative value, then operations may continue at block 530.

At block 530, a determination may be made that the file has been modified subsequent to the generation of the first representative value and/or storage of approval information for the file. For example, following a modification of the file, a generated second representative value may not match a previously generated first representative value. At block 535, at least one alert associated with the file may be generated, such as an alert message indicating that the file has been modified. Each generated alert may then be communicated to one or more appropriate recipients. Operations may then continue at block 540, and execution of the file may be prevented. Following the prevention of the file execution, operations of the method 500 may end.

If, however, it is determined at block 525 that a stored first representative value for the file matches the generated second representative value, then operations may continue at block 545. At block 545, a determination may be made as to whether adequate approval information is available for the file. For example, a determination may be made as to whether required file approval information (e.g., electronic signatures associated with file review, etc.) is stored in association with the file and/or the first representative value. If it is determined at block 545 that approval information is not available, then operations may continue at block 535, and at least one suitable alert may be generated and communicated in association with the file. Operations may then continue at block 540, and execution of the file may be prevented. If, however, it is determined at block 545 that approval information is available, then operations may continue at block 550. At block 550, execution of the file may be permitted. In other words, execution of the file may only be permitted if the file has not been modified, and adequate approval information has been stored for the file. In this regard, additional security may be provided for proprietary information (e.g., healthcare information) that is processed by the file. The method 500 may end following either block 540 or block 550.

The operations described and shown in the methods 400 and 500 of FIGS. 4-5 may be carried out or performed in any suitable order as desired in various embodiments. Additionally, in certain embodiments, at least a portion of the operations may be carried out in parallel. Furthermore, in certain embodiments, less than or more than the operations described in FIGS. 4-5 may be performed.

Example embodiments of the disclosure can provide the technical effects of ensuring that adequate approval information is available for a specific version of a file or project prior to the file or project being permitted to execute. In this regard, additional security may be provided for confidential information that may be processed by the file or project, such as confidential healthcare information. Additionally, as desired, various alerts and/or corrective actions may be generated in the event that adequate approval information is not available for a file or project.

Various block and/or flow diagrams of systems, methods, apparatus, and/or computer program products according to example embodiments of the disclosure are described above. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments.

These computer-executable program instructions may be loaded onto a special purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special purpose, hardware-based computer systems that perform the specified functions, elements or steps, or combinations of special purpose hardware and computer instructions.

Many modifications and other embodiments of the disclosure set forth herein will be apparent having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method, comprising:
    identifying, by a computing system comprising one or more computers, a file of computer-executable code that facilitates the processing of proprietary information when executed by at least one processor;
    performing, by the computing system, at least one hashing operation on the file to generate a first representative value associated with the file;
    receiving, by the computing system, at least one approval associated with validation of the file;
    storing, by the computing system, the at least one approval in association with the generated representative value;
    determining, by the computing system prior to the execution of the file and utilizing the at least one hashing operation, a second representative value associated with the file; and
    comparing, by the computing system prior to the execution of the file, the first representative value to the second representative value, wherein,
        if the second representative value matches the stored first representative value and at least one approval is available, selectively permitting, by the computing system, execution of the file, and
        if the second representative value does not match the stored first representative value, determining by the computing system based at least in part upon a comparison of the first representative value to the second representative value, that the file has been modified subsequent to the storage of the at least one approval, wherein execution of the file is not permitted based upon the determination that the file has been modified.

2. The method of claim 1, wherein receiving at least one approval comprises receiving a plurality of approvals associated with validation of the file.

3. The method of claim 1, wherein receiving at least one approval comprises:
   receiving, by the computing system, a first electronic signature indicating that a first individual has validated the file; and
   receiving, by the computing system, a second electronic signature indicating that a second individual has validated the file.

4. The method of claim 1, further comprising:
   outputting, by the computing system for presentation to at least one user, one or more prompts for approval information;
   receiving, by the computing system, user input associated with the one or more prompts; and
   generating, by the computing system, the at least one approval based at least in part upon an evaluation of the received user input.

5. The method of claim 1, wherein identifying a file comprises identifying at least one of (i) a script or (ii) a plug-in associated with the processing of proprietary healthcare information.

6. The method of claim 1, further comprising:
   obtaining, by the computing system, scheduling information associated with the execution of the file;
   identifying, by the computing system based at least in part upon the scheduling information, an execution time for the file,
   wherein selectively permitting execution of the file comprises selectively permitting execution of the file at the identified execution time.

7. The method of claim 1, further comprising:
   generating, by the computing system based upon a determination that the at least one approval is not available, at least one alert message; and communicating, by the computing system, the at least one alert message to a recipient.

8. A system, comprising:
   at least one memory that stores computer-executable instructions; and
   at least one processor that accesses the at least one memory and executes the computer-executable instructions to:
   identify a file of computer-executable code that facilitates the processing of proprietary information when executed by at least one processor;
   perform at least one hashing operation on the file to generate a first representative value associated with the file;
   receive at least one approval associated with validation of the file;
   store the at least one approval in association with the generated representative value;
   determine, prior to the execution of the file and utilizing the at least one hashing operation, a second representative value associated with the file; and
   compare, prior to the execution of the file, the first representative value to the second representative value, wherein,
   if the second representative value matches the stored first representative value and at least one approval is available, selectively permitting, by the computing system, execution of the file, and
   if the second representative value does not match the stored first representative value, determining by the computing system based upon a comparison of the first representative value to the second representative value, that the file has been modified subsequent to the storage of the at least one approval, wherein execution of the file is not permitted based upon the determination that the file has been modified.

9. The system of claim 8, wherein the at least one approval comprises a plurality of approvals associated with validation of the file.

10. The system of claim 8, wherein the at least one approval comprises:
    a first electronic signature indicating that a first individual has validated the file; and
    a second electronic signature indicating that a second individual has validated the file.

11. The system of claim 8, wherein the at least one processor further executes the computer-executable instructions to:
    direct the output of one or more prompts for approval information for presentation to at least one user;
    receive user input associated with the one or more prompts; and
    generate the at least one approval based at least in part upon an evaluation of the received user input.

12. The system of claim 8, wherein the file comprises at least one of (i) a script or (ii) a plug-in associated with the processing of proprietary healthcare information.

13. The system of claim 8, wherein the at least one processor further executes the computer-executable instructions to:
    obtain scheduling information associated with the execution of the file;
    identify, based at least in part upon the scheduling information, an execution time for the file; and
    selectively permit execution of the file at the identified execution time.

14. The system of claim 8, wherein the at least one processor further executes the computer-executable instructions to:
    generate, based upon one of (i) a determination that the second representative value does not match the stored first representative value or (ii) a determination that the at least one approval is not available, at least one alert message; and
    direct communication of the at least one alert message to a recipient.

15. A method, comprising:
    identifying, by a computing system comprising one or more computers, a file of computer-executable code;
    determining, by the computing system prior to the execution of the file and based upon the performance of at least one hashing operation on the file, a representative value associated with the file;
    accessing, by the computing system, stored representative value information, the stored representative value information previously generated utilizing the at least one hashing operation;
    determining, by the computing system, whether the generated representative value corresponds to the stored representative value;

determining, by the computing system, whether at least one approval associated with the validation of the file is stored in association with the stored representative value; and comparing, by the computing system prior to the execution of the file, the first representative value to the second representative value, wherein,     if the second representative value matches the stored first representative value and at least one approval is available, selectively permitting, by the computing system, execution of the file, and     if the second representative value does not match the stored first representative value, determining by the computing system based at least in part upon a comparison of the first representative value to the second representative value, that the file has been modified subsequent to the storage of the at least one approval, wherein execution of the file is not permitted based upon the determination that the file has been modified.

16. The method of claim 15, wherein generating a first representative value comprises generating a first representative value by executing at least one hashing operation on the file, and     wherein generating a second representative value comprises generating a second representative value by executing the at least one hashing operation on the file.

17. The method of claim 15, wherein determining whether at least one approval is stored comprises determining whether a plurality of electronic signatures is stored.

18. The method of claim 15, further comprising:

obtaining, by the computing system, scheduling information associated with the execution of the file;

identifying, by the computing system based at least in part upon the scheduling information, an execution time for the file,     wherein selectively permitting execution of the file comprises selectively permitting execution of the file at the identified execution time.

\* \* \* \* \*